No. 729,586. PATENTED JUNE 2, 1903.
E. G. HOFFMANN.
ROAD VEHICLE.
APPLICATION FILED MAR. 14, 1903.
NO MODEL. 2 SHEETS—SHEET 1.
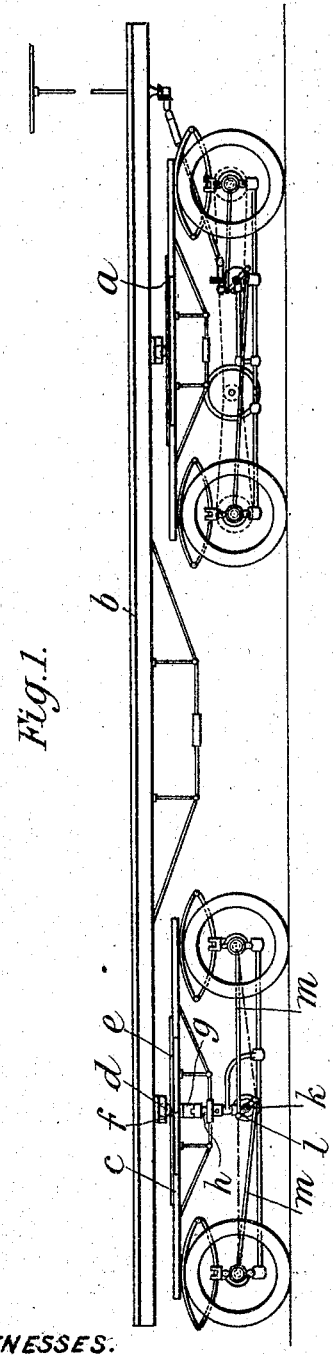
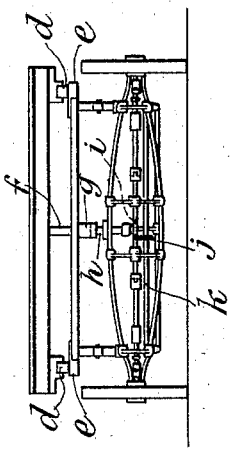
WITNESSES: INVENTOR.

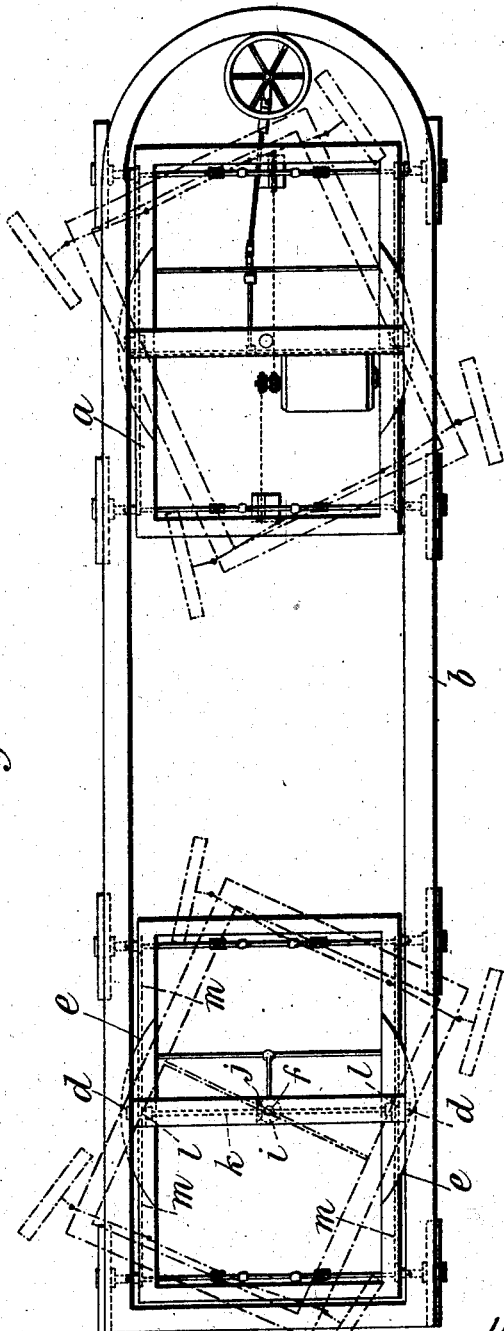

No. 729,586. Patented June 2, 1903.

UNITED STATES PATENT OFFICE.

ERNST GUSTAV HOFFMANN, OF WEST HAMPSTEAD, ENGLAND.

ROAD-VEHICLE.

SPECIFICATION forming part of Letters Patent No. 729,586, dated June 2, 1903.

Original application filed July 9, 1901, Serial No. 67,585. Divided and this application filed March 14, 1903, Serial No. 147,705. (No model.)

*To all whom it may concern:*

Be it known that I, ERNST GUSTAV HOFFMANN, a subject of the German Emperor, residing at 6 Lyncroft Gardens, West Hampstead, in the county of Middlesex, England, have invented a new and useful Improvement in Road-Vehicles, of which the following is a specification, being a divisional application from that filed by me on July 9, 1901, under Serial No. 67,585.

It has heretofore been proposed to steer all four wheels of road-vehicles from hand-steering devices, so that the steering of the vehicle may be properly effected.

According to this invention it is proposed to steer the wheels of a truck or bogie from the car-body or platform automatically, so that the truck portion will follow the movement of the car-body or platform as the same is moved either by being hauled by another propelled vehicle or motive force or by the movement of the front or rear part of such car-body or platform, if the same is long enough to be provided with a suitable engine or motor.

In the accompanying drawings are illustrated one form of the invention.

Figure 1 is a side elevation of car-body or platform adapted for road traction, having a driving and steering truck and a trailing truck steered in accordance with my invention. Fig. 2 is an end view looking from the left hand, and Fig. 3 is a plan.

The front truck or bogie *a* supports that end of its platform or car-body *b* and is hand-steered or driven by a suitable motor in any convenient way, as same does not form part of this invention. Although described as the front truck, such truck *a* may be the rear one if the vehicle is to be pushed instead of pulled.

The rear truck or bogie *c* supports its end of the car-body or platform by means of rollers *d d*, carried on the under side of the latter and adapted to rest and move on arcs *e* on the truck-body. On its under side the platform *b* carries a central pivot pin or shaft *f*, keyed or fixed thereto, which is connected to a shaft *h* by a sliding or telescopic joint *g* to allow for vertical movement caused by compression of the truck-springs, the part of the shaft *h* entering the joint *g* being keyed to it, so that it may turn therewith. The shaft *h* extends to and terminates in a bevel gear-wheel *i*, engaging with a similar wheel *j* on the shaft *k*, which carries at each end arms *l l*, from which run rods *m m m m* to the short axles of all four wheels, which are jointed in a manner (which does not form part of this invention) that as the rods *m* are pushed or pulled the wheels will be separately steered. By these means a deflection of the car-body or platform *b* will partly rotate its pivot pin or shaft *f*, and so through telescopic joint *g*, shaft *h*, and bevel-gears *i j* will rotate shaft *k*, thus moving arms *l* and rods *m* and steering all four wheels, such movement taking place simultaneously with the movement of the body *b*, so that the truck and wheels immediately follow the movement of said body whether it is produced by the action of the front truck or whether it is a separate platform or car which is being pulled by a motor, the steering of the truck being equally desirable in both cases.

It will be understood that the pin or shaft *f* need not necessarily be a central or pivot pin as long as it is arranged to be rotated by the turning movement of the platform portion *a*, which may be done by suitable gearing, by racks, or in other ways.

The invention, broadly stated, consists in utilizing the relative position of the platform to the rear (or front) truck to cause such rear (or front) truck to follow the movement of the platform.

What I claim is—

In a vehicle the combination with a leading truck and means for steering and driving same, of a trailing truck and means carried by the vehicle-body and operated by the movement of same for steering all the wheels of said truck.

In testimony whereof I have hereunto set my hand in the presence of two subscribing witnesses.

ERNST GUSTAV HOFFMANN.

Witnesses:
A. KNIGHT CROAD,
GEORGE I. BRIDGES.